United States Patent
Seo et al.

(10) Patent No.: US 6,731,938 B1
(45) Date of Patent: May 4, 2004

(54) WIRELESS COMMUNICATION SYSTEM FOR INCREASING REVERSE LINK CAPACITY

(75) Inventors: Sang-Hoon Seo, Seoul (KR); Jong-Min Cheong, Seoul (KR); Tae-Hoon Park, Seoul (KR); Jin-Ick Lee, Seoul (KR); Sun Park, Seoul (KR)

(73) Assignee: SK Telecom Co., Ltd., Seoul (KR)

( * ) Notice: Subject to any disclaimer, the term of this patent is extended or adjusted under 35 U.S.C. 154(b) by 40 days.

(21) Appl. No.: 09/642,616

(22) Filed: Aug. 17, 2000

(30) Foreign Application Priority Data

Aug. 17, 1999 (KR) ......................................... 1999-33823

(51) Int. Cl.[7] ................................................. H04Q 7/20
(52) U.S. Cl. ...................... 455/446; 455/436; 455/403; 455/524
(58) Field of Search ................................ 455/446, 561, 455/444, 436, 449, 422, 403, 524–525

(56) References Cited

U.S. PATENT DOCUMENTS

| | | | | |
|---|---|---|---|---|
| 5,345,499 A | * | 9/1994 | Benveniste | 455/449 |
| 5,457,810 A | * | 10/1995 | Ivanov et al. | 455/441 |
| 5,548,806 A | * | 8/1996 | Yamaguchi et al. | 455/441 |
| 5,550,898 A | * | 8/1996 | Abbasi et al. | 370/336 |
| 5,640,678 A | * | 6/1997 | Ishikawa et al. | 455/449 |
| 5,715,516 A | * | 2/1998 | Howard et al. | 455/422.1 |
| 5,924,036 A | * | 7/1999 | Gustafson | 455/447 |
| 5,983,097 A | * | 11/1999 | Kakinuma et al. | 455/422.1 |
| 6,058,317 A | * | 5/2000 | Posti | 455/561 |
| 6,064,661 A | * | 5/2000 | Benn | 370/329 |
| 6,201,972 B1 | * | 3/2001 | Hamabe | 455/450 |
| 6,205,336 B1 | * | 3/2001 | Ostrup et al. | 455/444 |
| 6,363,261 B1 | * | 3/2002 | Raghavan | 455/561 |
| 6,381,230 B1 | * | 4/2002 | Wheatley et al. | 370/328 |

* cited by examiner

Primary Examiner—William Trost
Assistant Examiner—Sharad Rampuria
(74) Attorney, Agent, or Firm—Blakely, Sokoloff, Taylor & Zafman

(57) ABSTRACT

A macro-micro cell structure of wireless communication system for separately processing a forward and a reverse telecommunications in order to increase a reverse link capacity is disclosed.

The wireless telecommunication system has a macro cell and at least one micro cell within the macro cell. A micro cell signal processing unit processes a transmission and reception signal of a mobile station located at a service region of the micro cell. A micro cell base station transmits a micro cell forward signal provided from said micro cell signal processing unit to the mobile station to receive a micro cell reverse signal, and receives a macro cell reverse signal of the mobile station which is located at the macro cell and has a short wave path contrast to the macro cell. A macro cell signal processing unit transmits a forward signal to the mobile station through a macro cell antenna and processes the reverse signal provided from said macro cell antenna or said micro cell base station. A transit unit transits the macro cell reverse signal to the macro cell signal processing unit and transiting the signal between the micro cell base station and the micro cell signal processing unit.

13 Claims, 6 Drawing Sheets

WIRELESS COMMUNICATION SYSTEM FOR INCREASING REVERSE LINK CAPACITY

FIELD OF THE INVENTION

The present invention relates to a wireless communication system, more particularly, to a macro-micro cell structure of wireless communication system for separately processing a forward and a reverse telecommunications in order to increase a reverse link capacity.

DESCRIPTION OF THE PRIOR ART

There are many wireless telecommunication system structures.

One of the telecommunication structures is a macro-micro cell structure of telecommunication system.

FIG. 1 shows a typical macro-micro cell structure of telecommunication system.

As shown in FIG. 1, there are three macro cells 101, 102 and 103. In one macro cell 101, there are one micro cell 104 and two mobile stations 105 and 106.

In order to perform the macro cell service in the prior art, a telecommunication signal is received or transmitted through an antenna 107 located at the macro cell 101. In the same manner, in order to perform the micro cell service, another telecommunication signal is received or transmitted through another antenna 108 located at the micro cell 104. The micro cell is established within the macro cell in case that the number of subscribers in a particular area of the macro cell is over a predetermined number.

In case that both the frequency bands at the macro and the micro cells are identical, the first mobile station 105 receives a forward signal which is provided from the antenna 107 located at the macro cell and transmits a reverse signal which is provided to the antenna 108 located at the micro cell. At this time, the transmission level of the mobile station is very high so that the high level of transmission signal interferes the micro cell. Thereby, the interference decreases the reverse link capacity of the micro cell.

SUMMARY OF THE INVENTION

It is, therefore, a primary object of the invention to provide a macro-micro cell structure of wireless communication system for effectively processing a forward and a reverse telecommunications in order to increase a reverse link capacity.

In accordance with the present invention, there is provided a wireless telecommunication system having a macro-micro structure which has a macro cell and at least one micro cell within the macro cell, comprising: a micro cell signal processing means, remotely located from the micro cell, for processing a transmission and reception signal of a mobile station located at a service region of the micro cell; a micro cell base station for transmitting a micro cell forward signal provided from said micro cell signal processing means to the mobile station, receiving a micro cell reverse signal, and receiving a macro cell reverse signal of the mobile station which is located at the macro cell and has a short wave path contrast to the macro cell; a macro cell signal processing means for transmitting a forward signal to the mobile station through a macro cell antenna and processing the reverse signal provided from said macro cell antenna or said micro cell base station; and a transit means for transiting said macro cell reverse signal to the macro cell signal processing means and transiting the signal between the micro cell base station and the micro cell signal processing means.

Above described the transit means includes: a macro cell signal transit means for transiting said macro cell reverse signal to the macro cell signal processing means; and a micro cell transit means for transiting the signal between the micro cell base station and the micro cell signal processing means.

And, the macro cell signal transit means includes: a first converting means for converting the signal provided from the micro cell base station according to a predetermined signal transmission method to the signal according to the mobile station transmission method; and a reverse signal transmission means for converting a frequency type of said signal according to the mobile station transmission method to a mobile station frequency type and transmitting the converted signal to the macro cell signal processing means.

And, the micro cell signal transit means includes: a second converting means for converting the signal provided from the micro cell base station according to a predetermined signal transmission method to the signal according to a micro cell signal transmission method; a signal transmission means for converting a frequency type of the signal according to the micro cell signal transmission method to a micro cell frequency type, transmitting the converted signal to the micro cell signal processing means, and for converting the signal, which is to be provided from the micro cell signal processing means and to be provided to the micro cell base station, to the predetermined type of frequency signal; and a third converting means for converting the predetermined type of frequency signal provided from the signal transmission means to the predetermined signal method and transmitting the converted signal to the micro cell base station.

In accordance with the present invention, there is another wireless telecommunication system having a macro-micro structure which has a macro cell and at least one micro cell within the macro cell, comprising: a micro cell base station for transmitting and receiving a transmission and reception signal to/from a mobile station located at a service region of the micro cell, and receiving a micro cell reverse signal of the mobile station which is located at the macro cell and has a short wave path contrast to the macro cell; a macro cell signal processing means for transmitting a forward signal to the mobile station through a macro cell antenna and processing the reverse signal provided from said macro cell antenna or said micro cell base station; and a transit means for transiting said macro cell reverse signal to the macro cell signal processing means.

Wherein, the transit means includes a first converting means for converting the signal provided from the micro cell base station according to a predetermined signal transmission method to the signal according to the mobile station transmission method; and a reverse signal transmission means for converting a frequency type of said signal according to the mobile station transmission method to a mobile station frequency type and transmitting the converted signal to the macro cell signal processing means.

Wherein, the micro cell base station includes a micro cell base station transmission means for filtering said macro cell reverse signal, and converting the filtered signal to a predetermined frequency type of signal; and a fourth converting means for receiving the signal from the micro cell base station transmission means, converting the received signal to the predetermined signal transmission method and transmitting the converted signal to the transmit means.

In accordance with the present invention, there is provided still another wireless telecommunication system having a macro-micro structure which has a macro cell and at least one micro cell within the macro cell, comprising: a base station for transmitting a forward signal to a mobile station and receiving a reverse signal from the mobile station; and at least one reverse signal receiving means, established at a predetermined region of the base station cell, for receiving the reverse signal and transmitting the received reverse signal to the base station in order to reduce a wave loss and interference.

The present invention provides a scheme for increasing the reverse link capacity of the wireless communication system. The scheme is similar to a distributed antenna structure at the view point of the mobile station.

These and other features of the present invention are more fully shown and described in the drawings and detailed description of this invention. It is to be understood, however, that the description and drawings are for the purpose of illustration and should not be read in a manner that would unduly limit the scope of this invention.

BRIEF DESCRIPTION OF THE DRAWINGS

The above and other objects and features of the instant invention will become apparent from the following description of preferred embodiments taken in conjunction with the accompanying drawings, in which.

DETAILED DESCRIPTION OF THE INVENTION

Figure 1:
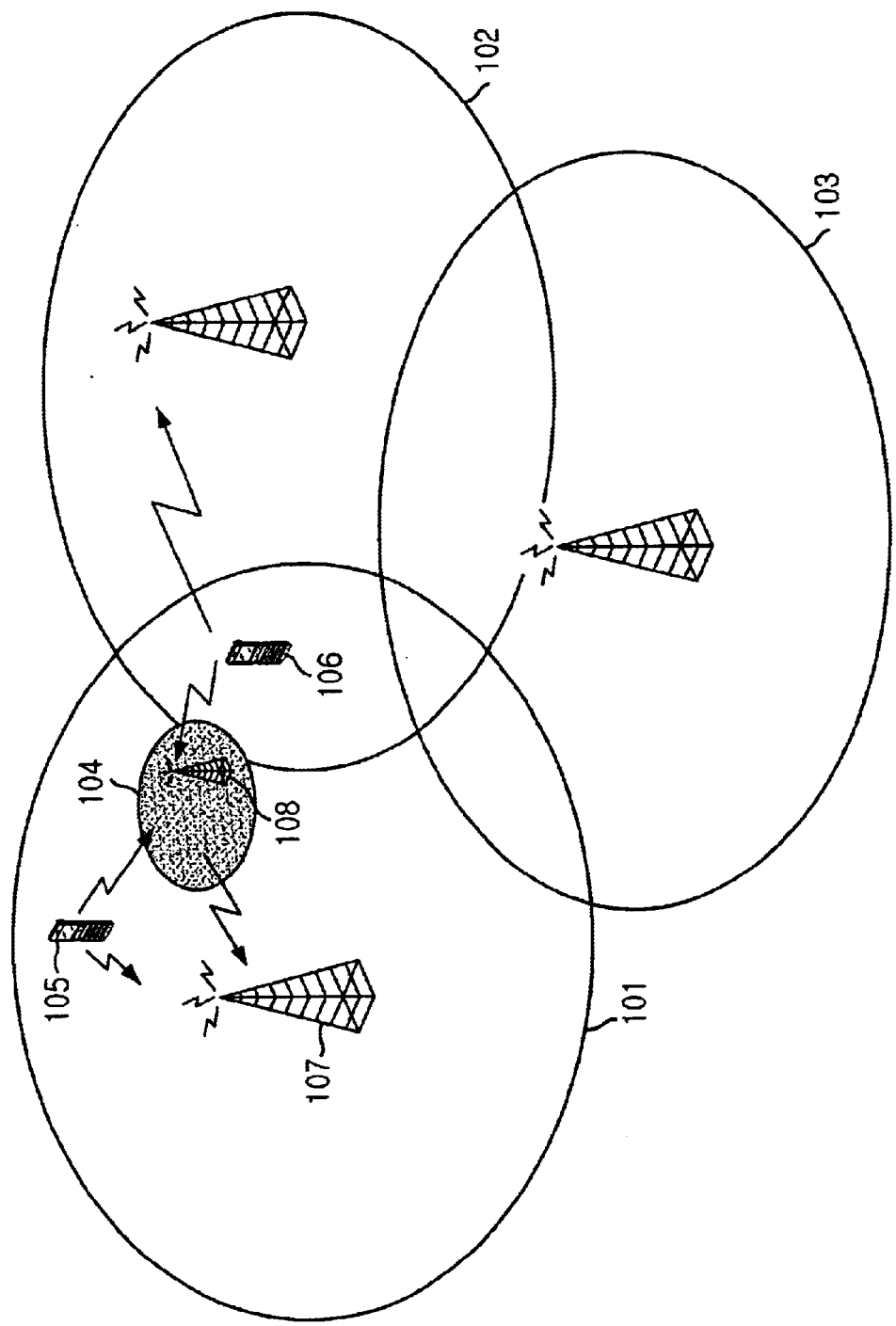
FIG. 1 is a schematic diagram of a typical wireless telecommunication system with a macro-micro cell structure.
Figure 2:
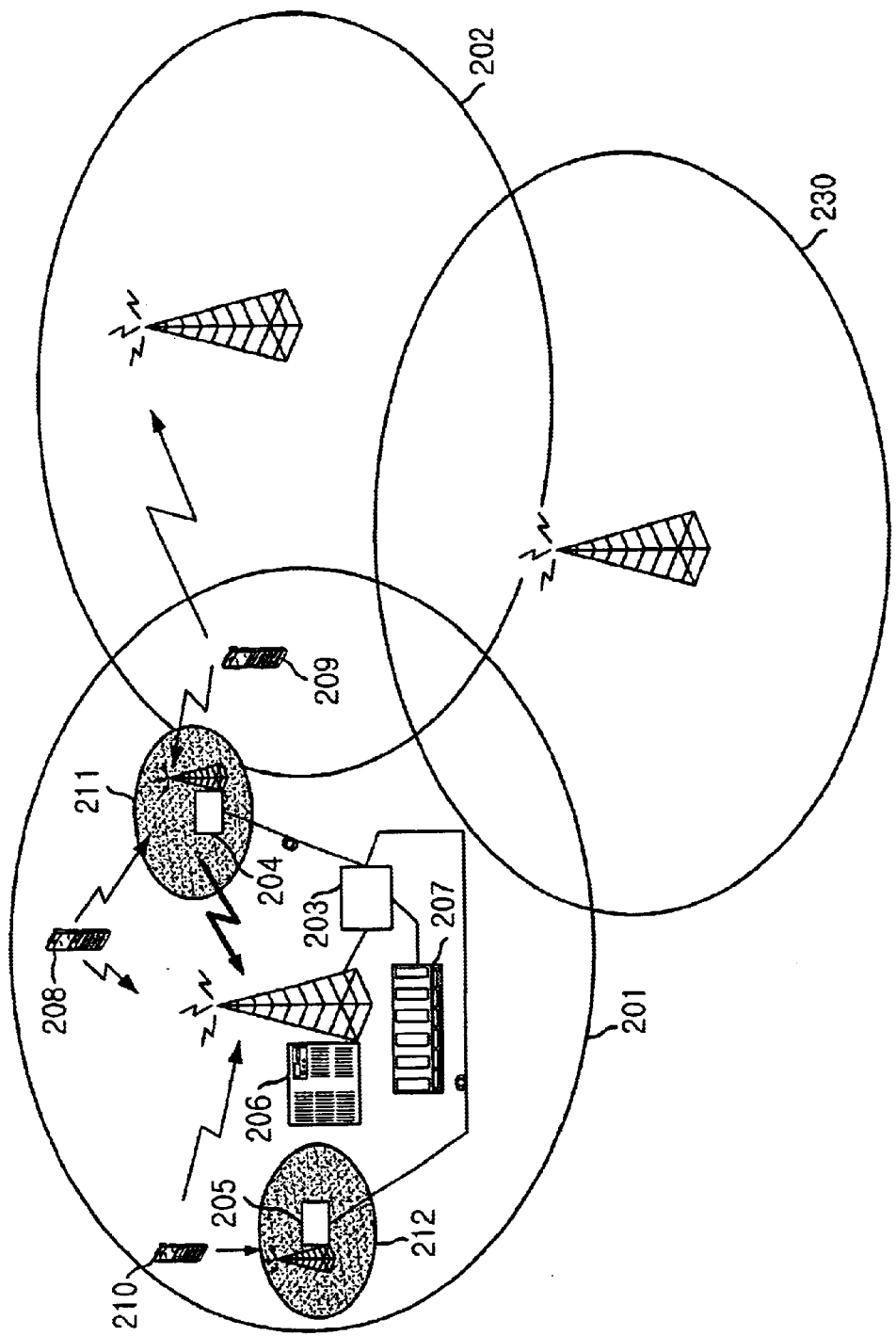
FIG. 2 shows a schematic diagram of a wireless telecommunication system in accordance with one embodiment of the present invention.

Referring to FIG. 2, there is shown a schematic diagram of a wireless communication system according to one embodiment of the present invention.

As shown in FIG. 2, the wireless communication system has a macro-micro cell structure. The wireless communication system contains a first macro cell 201, a second macro cell 202 and a third macro cell 230. The first macro cell 201 includes a first micro cell 211 and a second micro cell 212.

In the first macro cell 201, there are a macro cell base station equipment 206 and a micro cell base station equipment 207. Within the first micro cell 211, there is a first remote equipment 204 for receiving a reverse signal. And, there is a second remote equipment 205 for receiving the reverse signal in the second micro cell 205. Between the two remote equipments 204 and 205 and the two base stations 206 and 207, there is a transit equipment 203 for connecting each other.

In the macro cell service area, there are a first, a second and a third mobile stations 208, 209 and 210, each of which receives a forward signal from an antenna of one of the macro cell base stations and transmits a reverse signal to an antenna of one of the micro cell base station.

In case that there occurs a region wherein subscribers are overflow, the region is established with a macro-micro cell structure. At this time, frequency regions corresponding to the macro and the micro cells are different. That is, channels corresponding to the macro and the micro cells are different.

Figure 3:
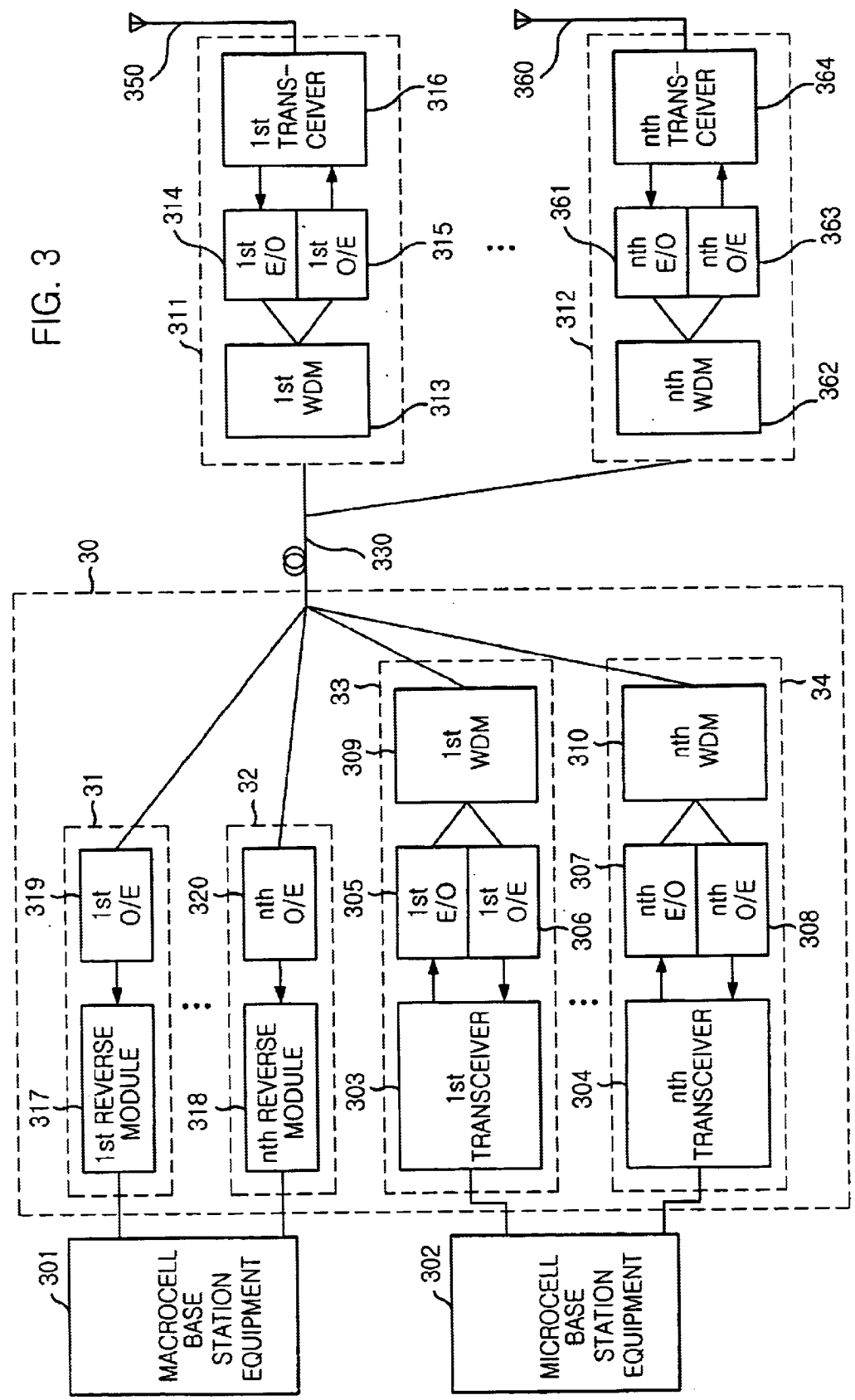
FIG. 3 describes a detailed block diagram of the wireless telecommunication system.

The telecommunication path loss between the first mobile station 208 and the first macro cell base station 201 is larger than the telecommunication path loss between the first mobile station 208 and the micro cell base station 211. Accordingly, if the first mobile station 208 may use the antenna of the first micro cell 211 in common or utilize a reverse distributed antenna, it is possible to reduce the transmit power of the first mobile station. Each of the remote equipments 204, 205 transmits the received signal from each of the micro cells 211 and 212 to a transit equipment 203. The transit equipment 203 performs an interface between the macro cell base station equipment 206 and the micro cell base station equipment 207. The detailed structure thereof is shown in FIG. 3.

The transit equipment 203 may have two different operating parts corresponding to each of the base station equipments 206 and 207. Also, the transit equipment 203 may have one operating part with a branch structure in case that both the macro cell base station equipment 206 and the micro cell base station equipment 207 are located at one point.

The mobile stations 208, 209 and 210 located at the first and the second micro cells 211 and 212 receive the forward signal from the macro cell antennas. In case that, however, the mobile stations 208, 209 and 210 transmit the reverse signal to the micro cell antennas, the transmit power of each of the mobile stations 208, 209 and 210 can be reduced.

As described above, each of the micro cells in the macro-micro structure functions as like a distributed antenna to reduce the transmit power of the mobile station. Thereby, it is possible to minimize a cell interference of the mobile station. That is, the signal transmission in the micro cell is performed only by the reverse link without performing the forward link.

Although, in the embodiment of the invention, the signal is transmitted in an optical-transmit manner, a microwave transmission method may be employed as like a large arrow sign depicted between the first micro cell 211 and the first macro cell 201.

Referring to FIG. 3, there is a detailed block diagram of a system minimizing the reverse interference of the macro-micro cell structure.

The system includes a macro cell base station equipment 301, a micro cell base station equipment 302, a transit equipment 30 and two remote equipments 311 and 312.

The transit equipment 30 consists of a number of macro cell receiving equipments 31 and 32 and a number of micro cell base station equipments 33 and 34. Each of the macro cell receiving equipments 31 and 32 comprises a reverse module and an optical-to-electrical converter. The reverse models are depicted as reference numerals 317 and 318. The optical-to-electrical converters are illustrated as reference numerals 319 and 320. Each of the micro cell base station equipments 33 and 34 comprises a transceiver 303 or 304, an electrical-to-optical converter 305 or 307, an optical-to-electrical converter 306 or 308 and a wavelength division multiplexor 309 or 310.

Each of the remote equipments 311 and 312 has a wavelength division multiplexor 313 or 362, an electrical-to-optical converter 314 or 361, an optical-to-electrical converter 315 or 363 and a transceiver 316 or 364.

Although, in the embodiment of the invention, the signal is transmitted in an optical-transmit method, a microwave transmission method may be employed.

Both the base station equipments 301 and 302 may be placed on the same position, or also placed on a different spot.

Each of the micro cell base station equipments 33 and 34 is connected through a transmission line 330 made by an optical fiber to each of the remote equipments 311 and 312. Each of the macro cell receiving equipments 31 and 32 is also coupled to the transmission line 330. The connection of the optical fiber of the micro cell may be one-to-one type or star structure type. Any structure of the connection must branch out. However, the optical signal transmission is not related to the connection type. In the macro cell, the signal is only received.

There are a number of transmission methods to transmit the signal between the transit equipment 30 and each of the remote equipments 311 and 312.

One of the transmission methods is as follows. In case that the transceivers 303 and 304 of the micro cell base station equipments 33 and 34 directly transmit the signal, the transceivers 316 and 364 of the remote equipments 311 and 312 have to directly receive and transmit the CDMA RF signal. In case that the structure has a star form, each of the electrical-to-optical converters 305 and 307 generates a different optical wavelength for each of the base station equipments 33 and 34, and the optical-electrical converters 315 and 363 of the remote equipments 311 and 312 for receiving the optical wave have to utilize the same optical wavelength in order to receive the signal corresponding to the different optical waves.

In case of the reverse link, above described forward case is applied. That is, each of the electrical-to-optical converters 314 and 361 of the remote equipments 311 and 312 generates each of optical waves, and the optical-to-electrical converters 306 and 308 of the base station equipments 33 and 34 have to use the same optical wavelength in order to receive the optical signal provided from the remote equipments.

At this time, since the reverse function is only utilized in the macro cell, each of the optical-to-electrical converters 319 and 320 detects an optical wavelength which is used at the micro cell connected to itself. Also, the reverse block has a direct transmission form. In order to perform the above described service, the reverse module among each of the transceivers 316 and 364 of the remote equipments 311 and 312 may be made by a block which receives and processes even the macro cell signal, or may be made by a micro cell equipment and a macro cell reverse receiving equipment. The electrical-to-optical converter can process all of the different frequency bands because the frequency band of the optical signal is wide.

Each of the reverse modules 317 and 318 at the macro cell processes its own service frequency band. That is, although the micro cell signal is transmitted through the optical fiber, a desired signal is obtained by a filtering process and the filtered signal is transmitted to the macro cell base station 301. The function of the micro cell equipment is identical to the function of the module.

In case that the optical fiber connection between the base station equipment and the remote equipment is formed by one to one, a different optical source is not needed, and thus, the different optical source is utilized in the forward and reverse directions.

Secondly, the signal transmission between the transit equipment 30 and the remote equipments 311 and 312 is as follows.

In case that the signal which is transmitted through the optical fiber is sent with the intermediate frequency, in each of transceivers 303 and 304, RF signal is changed to the intermediate frequency in the forward link, and the intermediate frequency is changed to the RF signal in the reverse link. In each of the remote equipments 311 and 312, the intermediate frequency is changed to RF signal and the RF signal is changed to the intermediate signal. At this time, in the reverse signal processing, the macro cell signal is filtered and another band of intermediate frequency contrast to the micro cell is set. However, the intermediate frequency may be assigned to process the macro cell. But, in case that a different service band(Cellular and PCS) is employed, the different band must be processed.

In case that each of the transceivers 303 and 304 performs the intermediate frequency change, the signals provided from the transceivers 303 and 304 are combined and changed from the electrical signal to the optical signal. And, in the reverse link, the optical-to-electrical signal is divided and the divided signal is delivered to each of the transceivers wherein an assigned band of signal is changed to RF band of signal.

According to the status of the optical fiber connection, each of optical sources may have its own wavelength. This is considered by the optical bit noise of the optical source. That is, in case of the star structure, if the each of signals from the transceivers 303 and 304 is combined prior to the electrical-to-optical conversion, the same wavelength must be used, and otherwise, the different wavelength must be employed. In case that the optical source of which the bit noise can be ignored is employed, the identical optical wavelength may be utilized.

Thirdly, the transmission method uses a hybrid type wherein the intermediate frequency transmission is employed in the forward link, and the RF direct transmission is employed in the reverse link. In this case, the star structure is utilized in the forward link, and the one-to-one connection is utilized in the reverse link. In case that the macro signal is in the reverse direction, the macro cell signal is transmitted with the intermediate frequency. On the other hand, the star structure may be utilized in the reverse link, and the one-to-one connection mat be utilized in the forward link. In case that the optical source of which the bit noise can be ignored is employed, the identical optical wavelength may be utilized. Otherwise, the different optical wavelength must to be used.

Figure 4:
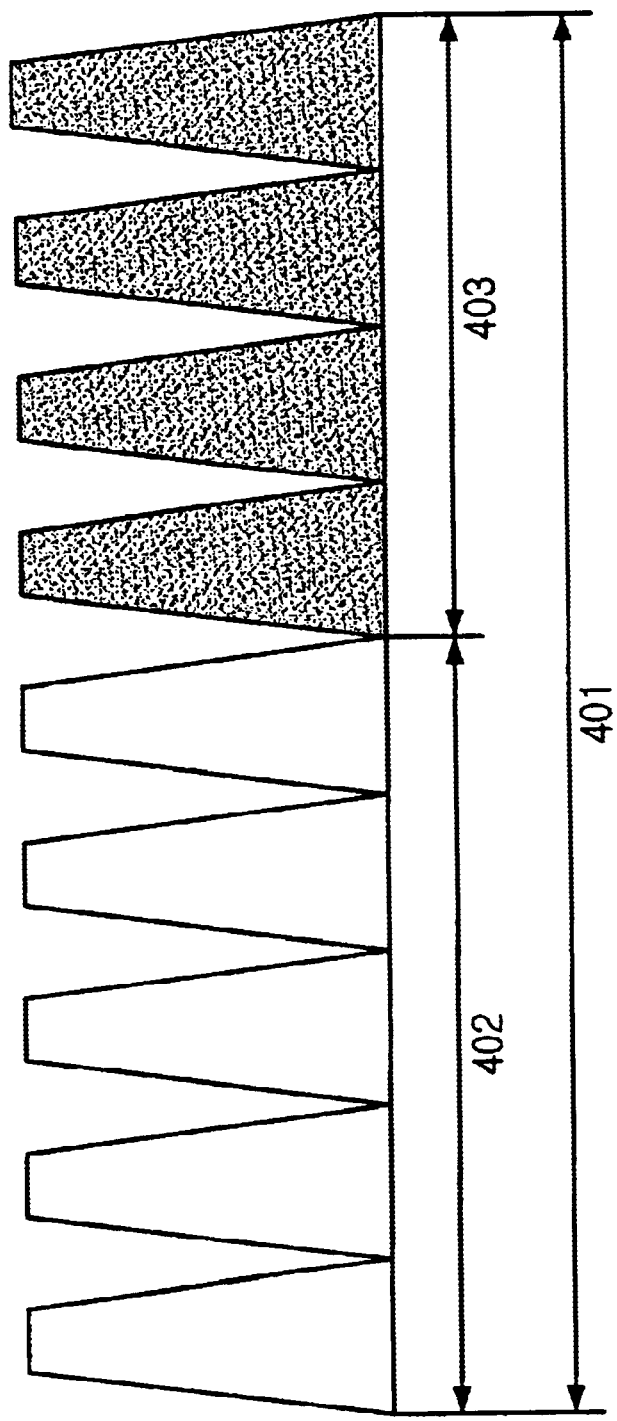
FIG. 4 depicts a frequency region used in the present invention.

FIG. 4 shows a frequency region used in the present invention.

A frequency band 401 used in the wireless telecommunication system contains two frequency bands 402 and 403. The frequency band 402 is used at the macro cell and the frequency band 403 is utilized at the micro cell. In case that the wave path loss between the mobile station and the macro cell base station antenna is larger than the mobile station and the micro cell base station antenna, the mobile station receives the forward wave from the macro cell base station antenna and transmits the reverse wave to the micro cell base station antenna.

This case is to be possible in case that the frequency bands of the macro cell and micro cell are different. In case that both the frequency regions between the macro cell and the micro cell are identical, it is possible to minimize the wave interference of the micro cell by using a directional antenna for the macro cell.

Figure 5:
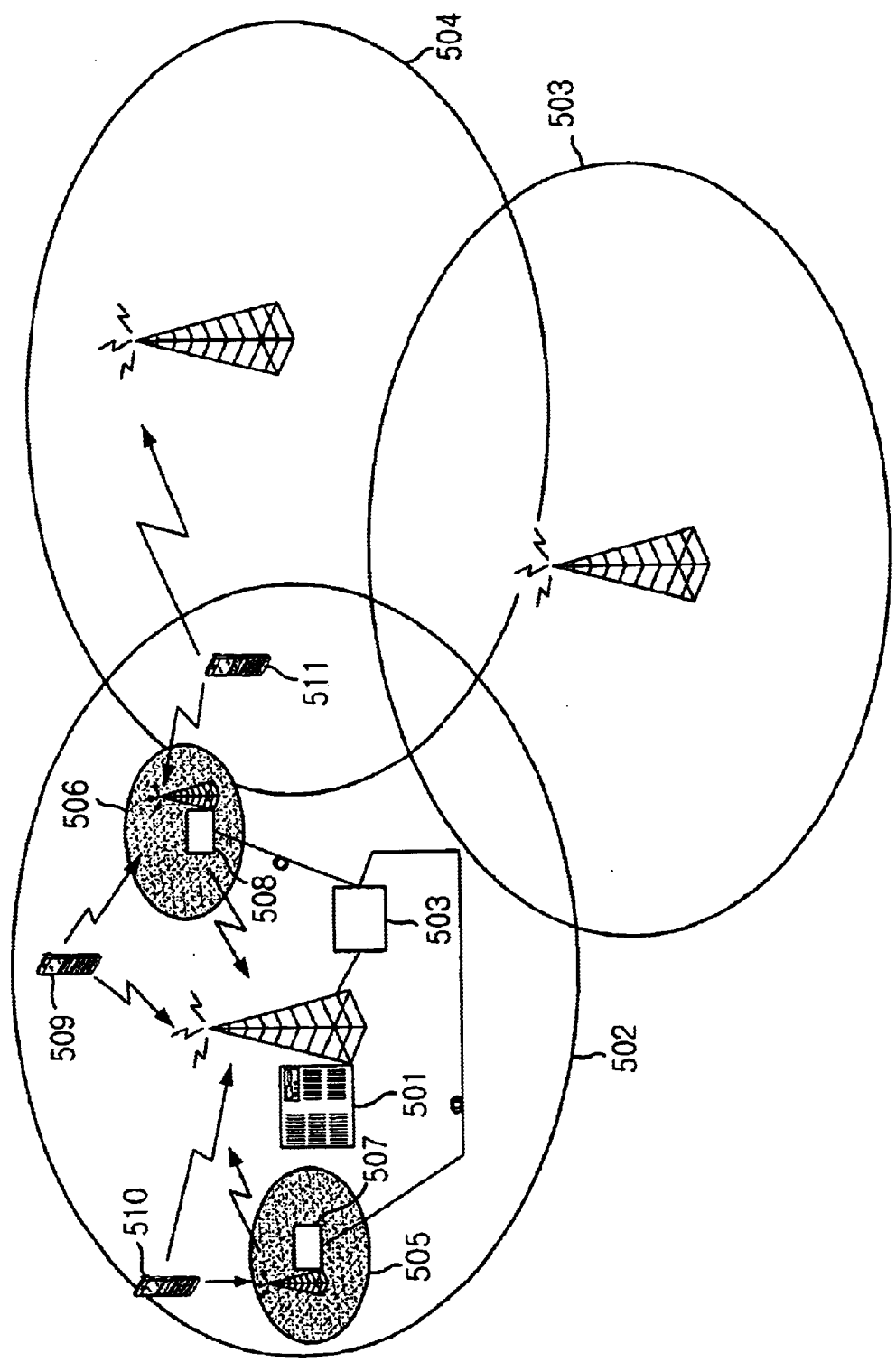
FIG. 5 is a schematic diagram of a wireless telecommunication system in accordance with another embodiment of the present invention.

FIG. 5 illustrates another telecommunication system which minimizes the reverse interference at the macro-micro cell structure.

As shown in FIG. 5, the wireless communication system has a macro-micro cell structure. The wireless communication system contains a first macro cell 502, a second macro cell 503 and a third macro cell 504. The first macro cell 502 includes a first micro cell 505 and a second micro cell 506.

In the first macro cell 502, there is a macro cell base station equipment 501. In the first micro cell 505, there is first remote equipment 507 for receiving a reverse link signal. And, there is a second remote equipment 508 for receiving the reverse link signal in the second micro cell 506. Between the two remote equipments 507 and 508 and the base station 501, there is a transit equipment 503 for connecting each other.

In the macro cell service area, there are a first, a second and a third mobile stations 509, 510 and 511, each of which receives a forward signal from an antenna of one of the macro cell base stations and transmits a reverse signal to another antenna of one of the micro cell base stations.

According to the embodiment of the present invention, the micro cell base station equipment is located at the site, and the remote equipment 507 and 508 is located at another place to change the received reverse signal and transmit the changed signal to the transit equipment 203. At the transit equipment 203, the signal provided form the transit equipment 203 is provided to the macro cell base station 501.

Above described case is in case that the micro cell equipment is located at the site and only the reverse transit for processing only macro signal is established. Although this method is used in means that the macro cell mobile station utilizes the micro cell antenna in order to transmit the reverse signal, otherwise, the remote equipment 507 and 508 can be established at the outside region of the macro cell instead of the micro cell region. In case that only the reverse transit is established, the region is selected wherein the forward signal transmission is good, but the reverse signal transmission is bad.

Figure 6:
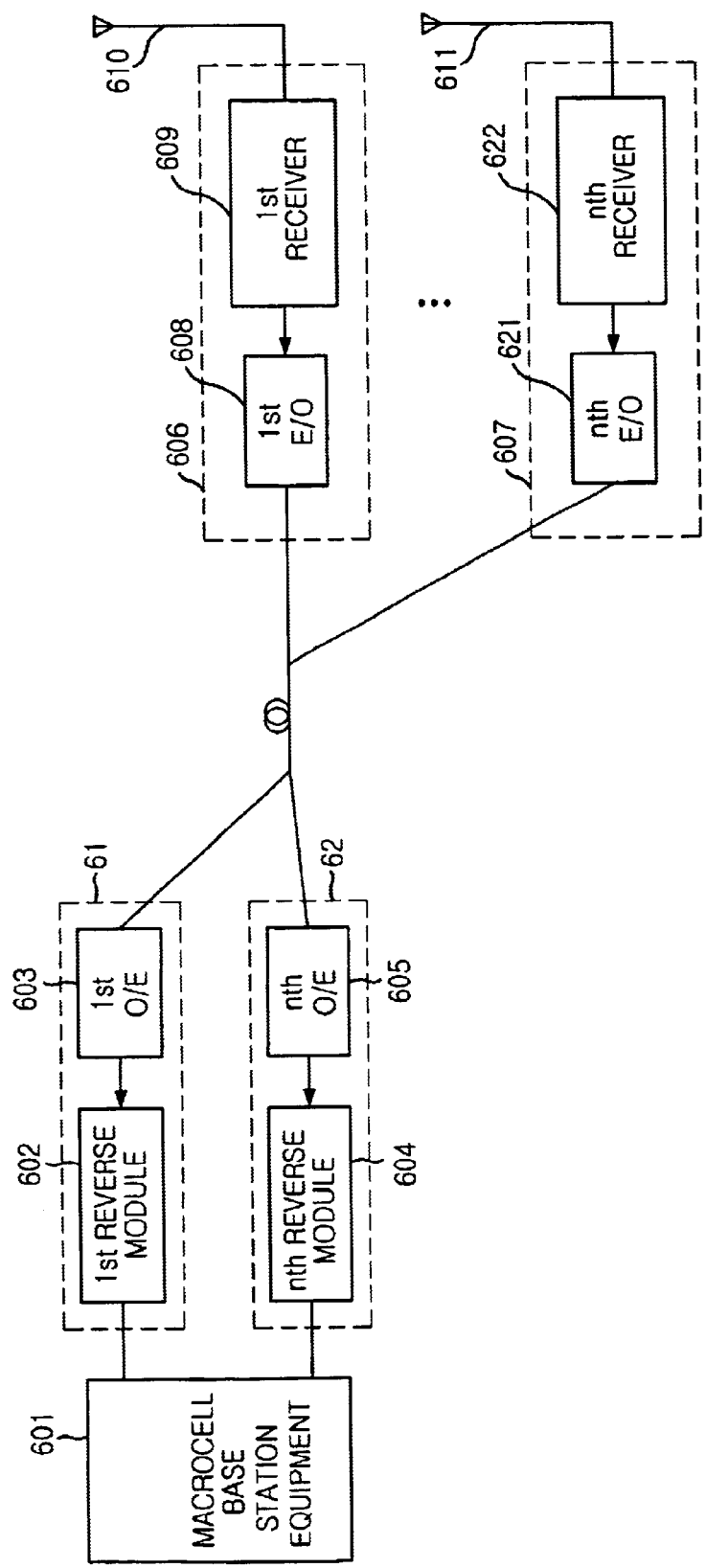
FIG. 6 describes a detailed block diagram of another wireless telecommunication system.

FIG. 6 shows a detailed block diagram of system of the macro-micro cell structure for minimizing the reverse interference according to one embodiment of the present invention.

As shown in FIG. 6, the system comprises a macro cell base station equipment 601, two macro cell receiving equipment 61 and 62, receiving remote equipment 606 and 607 and two antennas 610 and 611.

The macro cell receiving equipment 61 and 62 includes a number of reverse models 602 and 604, and a number of the receiving remote equipment 606 and 607 each of which consists of a number of electrical-to-optical converters 608 and 621 and a number of receivers 609 and 622.

The macro cell receiving equipments 61 and 62 receive the reverse signals provided from the micro cell base station or the remote reverse signal receiving equipment and process the received signal to transmit the processed signal to the macro cell base station equipment 601. The connection structure has many types. For example, the star structure or one-to-one may be utilized. In case of the one-to-one structure, an identical wavelength must be employed. In case of the star structure, the wavelength division multiplexing method or the identical wavelength can be used according to the sort of the optical sources. In case that the identical wavelength is used, the intermediate frequency transmission method is utilized.

At this time, the antennas 610 and 611 may be used in common with the micro cell or newly established for receiving the macro cell reverse signal.

The signal process of the system is as follows.

Firstly, the macro cell base station equipment 601 transmits a forward signal to the mobile station through the antenna in the macro cell. The mobile station transmits the reverse signal through one of the reverse receiving antennas 610 and 611 having less wave path loss. One of the antennas 610 and 611 receiving the reverse signal transmits the received signal to one of the receiving remote equipments 606 and 607. Each of the receiving remote equipments 606 and 607 converts the electrical signal to the optical signal and transmits the converted signal to each of the macro cell receiving equipment 61 and 62. The macro cell receiving equipments 61 and 62 perform the optical-to-electrical conversion and filtering processing, and then transmit the filtered signal to the macro cell base station equipment 601.

At this time, the receiver 609 of the receiving remote equipment 606 obtains only the reverse signal. And then, at the electrical-to-optical converter 608, the obtained signal is converted from the electrical signal to the optical signal.

At the optical-to-electrical converter 603 of the macro cell receiving equipment 61, the optical signal is converted to the electrical signal. At the reverse module 602, its own service frequency band is filtered and the filtered signal is transmitted to the macro cell base station equipment 601.

The present invention provides a scheme for increasing the reverse link capacity of the wireless communication system. The scheme is similar to a distributed antenna structure at the view point of the mobile station. This is applied to various wireless communication systems.

The present invention separately processes the forward transmission and the reverse reception and utilizes the reverse reception equipment in order to reduce wave path loss of the mobile station, thereby, increasing the capacity of the subscribers in the micro cell.

Since the present invention utilizes the reverse signal transit method, the mobile station transmits the signal at low power level to reduce the interference of the adjacent cell. The reduction of the interference increases the reverse link capacity of the micro cell.

Since the reverse signal is the low level of signal of the mobile station, the transmission power is reduced to extend a battery spending time.

Although the preferred embodiments of the invention have been disclosed for illustrative purposes, those skilled in the art will appreciate that various modifications, additions and substitutions are possible, without departing from the scope and spirit of the invention as disclosed in the accompanying claims.

What is claimed is:

1. A wireless telecommunication system having a macro-micro structure which has a macro cell and at least one micro cell within the macro cell, comprising:

a micro cell signal processing means, remotely located from the micro cell, for processing a transmission and reception signal of a mobile station located at a service region of the micro cell;

a micro cell base station for transmitting a micro cell forward signal provided from said micro cell signal processing means to the mobile station, receiving a micro cell reverse signal, and receiving a macro cell reverse signal of the mobile station which is located at the macro cell and has a short wave path contrast to the macro cell;

a macro cell signal processing means for transmitting a forward signal to the mobile station through a macro cell antenna and processing the macro cell reverse signal provided from said macro cell antenna or said micro cell base station; and a transit means for transiting the macro cell reverse signal to the macro cell signal processing means and transiting the signal between the micro cell base station and the micro cell signal processing means.

2. The wireless telecommunication system as recited in claim 1, wherein said transit means includes;

a macro cell signal transit means for transiting said macro cell reverse signal to the macro cell signal processing means; and a micro cell transit means for transiting the signal between the micro cell base station and the micro cell signal processing means.

3. The wireless telecommunication system as recited in claim 2, wherein said macro cell signal transit means includes:

a first converting means for converting the signal provided from the micro cell base station according to a predetermined signal transmission method to the signal according to the mobile station transmission method; and a reverse signal transmission means for converting a frequency type of said signal according to the mobile station transmission method to a mobile station frequency type and transmitting the converted signal to the macro cell signal processing means.

4. The wireless telecommunication system as recited in claim 3, wherein said micro cell signal transit means includes:

a second converting means for converting the signal provided from the micro cell base station according to a predetermined signal transmission method to the signal according to a micro cell signal transmission method;

a signal transmission means for converting a frequency type of the signal according to the micro cell signal transmission method to a micro cell frequency type, transmitting the converted signal to the micro cell signal processing means, and for converting the signal, which is to be provided from the micro cell signal processing means and to be provide to the micro cell base station to the predetermined type of frequency signal; and a third converting means for converting the predetermined type of frequency signal provided from the signal transmission means to the predetermined signal method and transmitting the converted signal to the micro cell base station.

5. The wireless telecommunication system as recited in one of claims 1–4, wherein the micro cell base station includes:

a micro cell base station transmission means for filtering said macro cell reverse signal, and converting the filtered signal to a predetermined frequency type of signal; and a fourth converting means for receiving the signal from the micro cell base station transmission means, converting the received signal to the predetermined signal transmission method and transmitting the converted signal to the transmit means.

6. The wireless telecommunication system as recited in claim 5, wherein said predetermined frequency type of signal is a radio frequency type of signal received from the mobile station.

7. The wireless telecommunication system as recited in claim 5, wherein said predetermined frequency type of signal is a predetermined intermediate frequency type of signal between the micro cell base station and the transit means.

8. The wireless telecommunication system as recited in claim 5, wherein said predetermined signal transmission method is an optical signal transmission between the micro cell base station and the transit means.

9. The wireless telecommunication system as recited in claim 5, wherein said predetermined signal transmission method is a micro wave transmission between the micro cell base station and the transit means.

10. A wireless telecommunication system having a macro-micro structure which has a macro cell and at least one micro cell within the macro cell, comprising:

a micro cell base station for transmitting and receiving a transmission and reception signal to/from a mobile station located at a service region of the micro cell, and receiving a micro cell reverse signal of the mobile station which is located at the macro cell and has a short wave path contrast to the macro cell;

a macro cell signal processing means for transmitting a forward signal to the mobile station through a macro cell antenna and processing the reverse signal provided from said macro cell antenna or said micro cell base station; and a transit means for transiting said macro cell reverse signal to the macro cell signal processing means.

11. The wireless telecommunication system as recited in claim 10, wherein said transit means includes;

a first converting means for converting the signal provided from the micro cell base station according to a predetermined signal transmission method to the signal according to the mobile station transmission method; and a reverse signal transmission means for converting a frequency type of said signal according to the mobile station transmission method to a mobile station frequency type and transmitting the converted signal to the macro cell signal processing means.

12. The wireless telecommunication system as recited in one of claims 10 or 11, wherein the micro cell base station includes:

a micro cell base station transmission means for filtering said macro cell reverse signal, and converting the filtered signal to a predetermined frequency type of signal; and a fourth converting means for receiving the signal from the micro cell base station transmission means, converting the received signal to the predetermined signal transmission method and transmitting the converted signal to the transmit means.

13. The wireless telecommunication system as recited in claim 10, wherein the micro cell reverse signal of the mobile station is transmitted to the micro cell base station having a wave path loss or the macro cell antenna.

* * * * *

UNITED STATES PATENT AND TRADEMARK OFFICE
CERTIFICATE OF CORRECTION

PATENT NO. : 6,731,938 B1
DATED : May 4, 2004
INVENTOR(S) : Seo et al.

It is certified that error appears in the above-identified patent and that said Letters Patent is hereby corrected as shown below:

Title page,
Item [57], ABSTRACT, please delete

"A macro-micro cell structure of wireless communication system for separately processing a forward and a reverse telecommunications in order to increase a reverse link capacity, is disclosed.
    The wireless telecommunication system has a macro cell and at least one micro cell within the macro cell. A micro cell signal processing unit processes a transmission and reception signal of a mobile station located at a service region of the micro cell. A micro cell base station transmits a micro cell forward signal provided from said micro cell signal processing unit to the mobile station to receive a micro cell reverse signal, and receives a macro cell reverse signal of the mobile station which is located at the macro cell and has a short wave path contrast to the macro cell. A macro cell signal processing unit transmits a forward signal to the mobile station through a macro cell antenna and processes the reverse signal provided from said macro cell antenna or said micro cell base station. A transit unit transits the macro cell reverse signal to the macro cell signal processing unit and transiting the signal between the micro cell base station and the micro cell signal processing unit."

and insert

-- A macro-micro cell structure of wireless communication system for separately processing a forward and a reverse telecommunications in order to increase a reverse link capacity. The system has a macro cell and at least one micro cell within the macro cell. A micro cell signal processing unit processes a transmission and reception signal of a mobile station located at a service region of the micro cell. A micro cell base station transmits a micro cell forward signal to the mobile station to receive a micro cell reverse signal, and receives a macro cell reverse signal of the mobile station which is located at the macro cell and has a short wave path contrast to the macro cell. A macro cell signal processing unit transmits a forward signal to the mobile station. A transit unit transits the macro cell reverse signal. --.

Column 10,
Line 2, delete "transit means includes;" and insert -- transit means includes: --.

Signed and Sealed this

Twenty-sixth Day of July, 2005

JON W. DUDAS
*Director of the United States Patent and Trademark Office*